(12) United States Patent
Blyth et al.

(10) Patent No.: US 10,131,427 B2
(45) Date of Patent: Nov. 20, 2018

(54) TILT-ROTOR OVER-TORQUE PROTECTION FROM ASYMMETRIC GUST

(71) Applicants: Robert Matthew Blyth, Fort Worth, TX (US); Paul Raymond Wilkinson, Media, PA (US)

(72) Inventors: Robert Matthew Blyth, Fort Worth, TX (US); Paul Raymond Wilkinson, Media, PA (US)

(73) Assignees: Bell Helicopter Textron Inc., Fort Worth, TX (US); The Boeing Company, Chicago, IL (US)

( * ) Notice: Subject to any disclaimer, the term of this patent is extended or adjusted under 35 U.S.C. 154(b) by 277 days.

(21) Appl. No.: 14/932,241

(22) Filed: Nov. 4, 2015

(65) Prior Publication Data

US 2017/0121029 A1    May 4, 2017

(51) Int. Cl.
| | |
|---|---|
| *G05D 1/00* | (2006.01) |
| *G05D 1/06* | (2006.01) |
| *G05D 3/00* | (2006.01) |
| *G06F 7/00* | (2006.01) |
| *G06F 17/00* | (2006.01) |
| *B64C 29/00* | (2006.01) |
| *B64C 11/30* | (2006.01) |
| *B64C 27/08* | (2006.01) |

(52) U.S. Cl.
CPC ........ *B64C 29/0033* (2013.01); *B64C 11/303* (2013.01); *B64C 11/308* (2013.01)

(58) Field of Classification Search
CPC ......... B64D 31/12; B64D 27/18; B64C 11/30; B64C 29/0033; B64C 27/08
USPC ............................................ 701/5; 244/17.23
See application file for complete search history.

(56) References Cited

U.S. PATENT DOCUMENTS

| | | | | |
|---|---|---|---|---|
| 3,699,351 A * | 10/1972 | Addie | ................... | B60K 6/383 105/36 |
| 5,749,540 A * | 5/1998 | Arlton | .................... | B64C 27/82 244/17.13 |
| 6,466,888 B1 * | 10/2002 | McCool | ............... | G05D 1/0825 702/144 |
| 2010/0264256 A1 * | 10/2010 | Yim | ........................ | B64C 27/20 244/17.23 |
| 2012/0283067 A1 * | 11/2012 | Roos | ..................... | B60W 10/06 477/100 |
| 2017/0075552 A1 * | 3/2017 | Berenbaum | ........... | G06F 3/0482 |

* cited by examiner

*Primary Examiner* — Mahmoud S Ismail
(74) *Attorney, Agent, or Firm* — James E. Walton

(57) ABSTRACT

A system includes a first mast torque transfer system, a second mast torque transfer system coupled to the first mast torque transfer system, and a torque limiting system. The torque limiting system includes a first sensor configured to determine a torque of the first mast torque transfer system, a second sensor configured to determine a torque of the second mast torque transfer system, and a processor configured to determine a differential torque between the torque of the first mast torque transfer system and the torque of the second mast torque transfer system and configured to control at least one of a torque input and a torque output to at least one of the first and second mast torque transfer systems as a function of the determined differential torque.

20 Claims, 12 Drawing Sheets

TILT-ROTOR OVER-TORQUE PROTECTION FROM ASYMMETRIC GUST

FEDERALLY SPONSORED RESEARCH AND DEVELOPMENT

This invention was made with government support under Contract #N00019-12-G-0006, Delivery Order #0044, awarded by the U.S. Naval Air Systems Command (NAVAIR) of Patuxent River, Md. The government has certain rights in the invention.

BACKGROUND

Field of the Invention

The present application relates to shaft driven systems. In particular, the present application relates to shaft driven systems associated with multiple rotors.

Description of Related Art

Some helicopters are configured as tiltrotor aircraft comprising multiple primary rotors. In some cases the rotors of the tiltrotor aircraft can be exposed to different environmental conditions, such as, but not limited to, asymmetrical gusts of wind. In cases where the rotors are connected to a shared gearbox, the gearbox, interconnecting shafts, and/or other rotor components can be exposed to torques in excess of working limits so that they require inspection, repair, and/or replacement.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
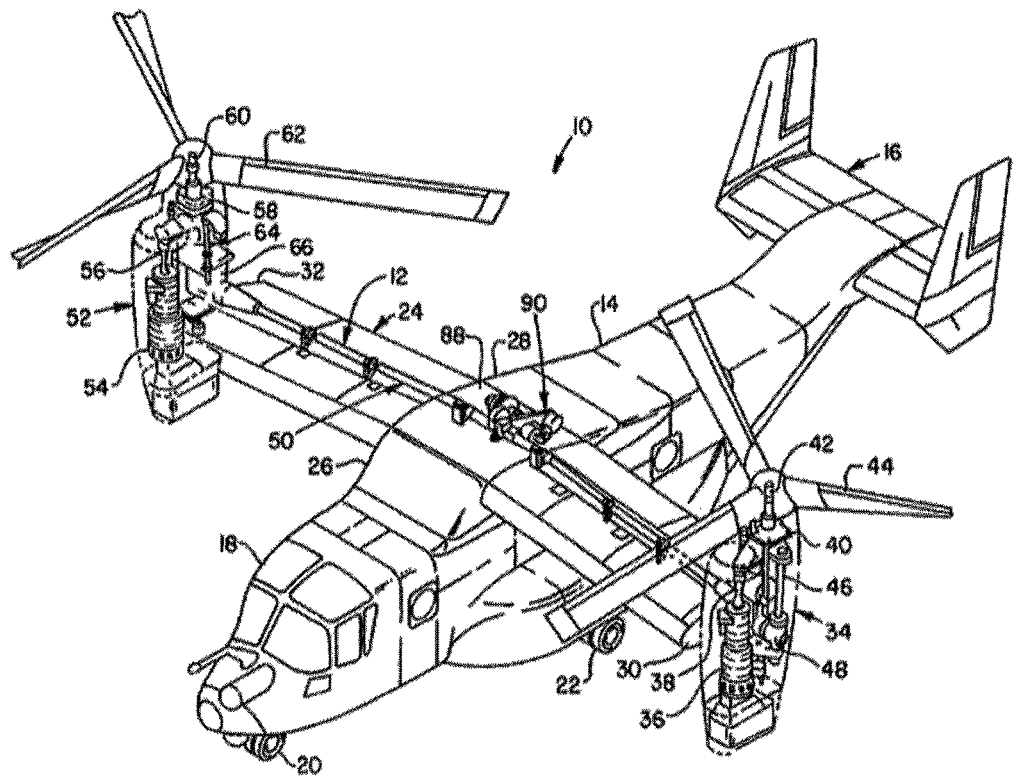
FIG. 1 is an oblique view of a tiltrotor aircraft according to the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1, a tiltrotor aircraft 10 comprises a drive system 12. The view of the aircraft 10 in FIG. 1 is provided with some portions of the skin of the aircraft 10 removed to more clearly show portions of the drive system 12. In addition to the drive system 12, the aircraft 10 includes a fuselage 14 which carries at its rear end an empennage assembly 16 and at its forward end a crew cockpit 18. Landing gear 20, 22 22 extend below the aircraft 10. A portion of the drive system 12 extends through a wing assembly 24 that is connected to and extends transversely across the fuselage 14. Fairings 26, 28 blend the wing into the fuselage contour. The wing assembly 24 on each side of the fuselage 14, is swept forward. The wing assembly 24, as it extends outwardly from each side of the fuselage 14, includes a dihedral angle. That is, the wing assembly 24 extends slightly upwardly toward the port wing tip 30 and the starboard wing tip 32. Pivotally mounted on the port wing tip 30 is a port pylon assembly 34 that includes an engine 36 having an output shaft 38 that is connected to a reducing gearbox 40. The gearbox 40 includes a propeller shaft 42 on which is mounted a port proprotor 44. Gearbox 40 also includes a drive shaft 46 that extends downwardly into a bevel gear/pivot assembly 48 which serves as a pivot for the pylon 34 on the wing assembly 24 and also connects the drive shaft 46 with a shaft assembly 50 that extends across the wing 24.

Similarly, a starboard pylon 52 is located adjacent the starboard wing tip 32. The starboard pylon 52 includes an engine 54 having an engine output shaft 56 that extends into a gear reducer 58. The gear reducer 58 includes an upwardly extending propeller shaft 60 which carries at its upper end a second or starboard proprotor 62. The gear reducer 58 also includes a shaft 64 that extends downwardly into a bevel gear and pivot assembly 66 that is utilized to pivotally connect the starboard pylon 52 with the wing assembly 24. The shaft assembly 50 extends across the wing assembly 24 of the aircraft 10 and has one end connected to the bevel gear and pivot assembly 48 at the port wing tip 30. The other end of the shaft assembly 50 is connected with the bevel gear and pivot assembly 66 at the starboard wing tip 32. The starboard engine 54 is connected to the starboard proprotor 62 through the engine output shaft 56, the gear reducer 58 and the prop shaft 60. The starboard engine 54 is also connected to the port proprotor 44 through the engine output shaft 56, the gear reducer 58, the drive shaft 64, the bevel gear and pivot assembly and shaft assembly 50. It will also be appreciated that the port engine 36 is similarly connected to both the port proprotor 44 and to the starboard proprotor 62. As arranged, either engine can drive either proprotor or both proprotors and both engines operating simultaneously will drive both proprotors supplying appropriate power required to the proprotor needing the power as is required. Control system described below are provided to coordinate the speed of the engines 36 and 54.

Figure 2:
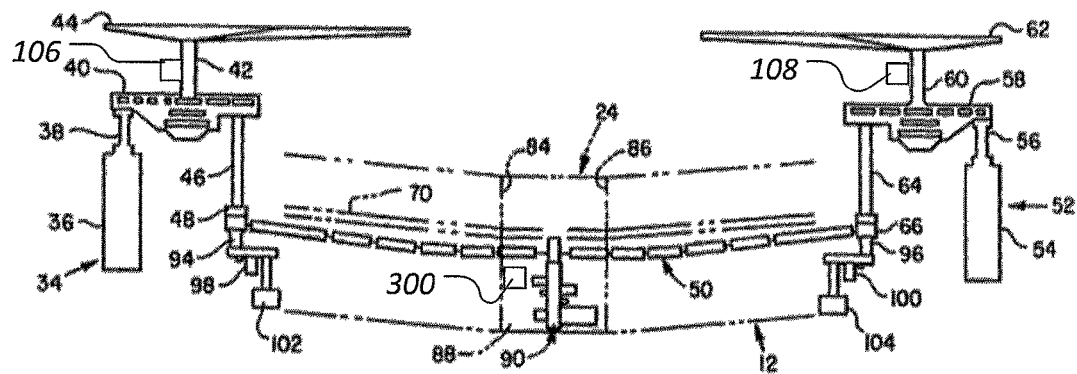
FIG. 2 is an orthogonal schematic side view of a drive system of the tiltrotor aircraft of FIG. 1.

Referring now to FIG. 2, the drive system 12 is shown schematically. A main wing spar 70 provides support across the wing assembly 24 for a plurality of spaced bearings and the like to aid in supporting the shaft assembly 50 is also shown in phantom lines. The requirement for a plurality of bearings along the shaft assembly 50 is necessitated by the incremental construction of the shaft assembly 50. The shaft assembly 50 has been divided into segments or increments for the purpose of accommodating the forward sweep of the wing assembly 24 as can be clearly seen in FIG. 2, to accommodate the wing dihedral angle which is not shown, and to accommodate the flexure of the wing assembly 24 during operation of the aircraft 10. The number of increments illustrated in FIG. 2 is not intended to be binding, but is shown only for purposes of illustration, the exact number of increments necessary will depend upon the amount of the sweep of the wing, the dihedral angle, also the amount of flexure in the wing assembly 24. In any event, each increment or segment of the shaft assembly 50 is connected to the other so that the shaft assembly 50 rotates as a single unit. A pair of spaced structural wing ribs 84 and 86 are located in a mid-wing 88 portion of the wing assembly 24. The ribs 84 and 86 generally coincide with the structural members of the fuselage 14. Located in the mid-wing portion 88 aft of the main wing spar 70 is a mid-wing gearbox that is generally designated by the reference character 90. Auxiliary shafts 94 and 96 from the bevel gear and pivot assemblies 48 and 66, respectively. The auxiliary shafts 94 and 96 each drive, through appropriate gear mechanisms, generators 98 and 100 and hydraulic pumps 102 and 104. In addition to the redundancy of the apparatus between the apparatus in the two pylons 34 and 52, the previously mentioned mid-wing gearbox assembly 90 also provides additional generators, air compressors and hydraulic pumps.

The proprotor 44 and the drive system 12 components connecting proprotor 44 to the mid-wing gearbox assembly 90 can be referred to collectively as a first mast torque transfer system. The proprotor 62 and the drive system 12 components connecting proprotor 62 to the mid-wing gearbox assembly 90 can be referred to collectively as a second mast torque transfer system. The first mast torque transfer system comprises a sensor 106 configured to sense torque transmitted by one or more of the first mast torque transfer system components. The second mast torque transfer system comprises a sensor 108 configured to sense torque transmitted by one or more of the second mast torque transfer system components. Each of the sensors 106, 108 can communicate with a general-purpose processor system 300 which is described in greater detail below.

Figure 3:
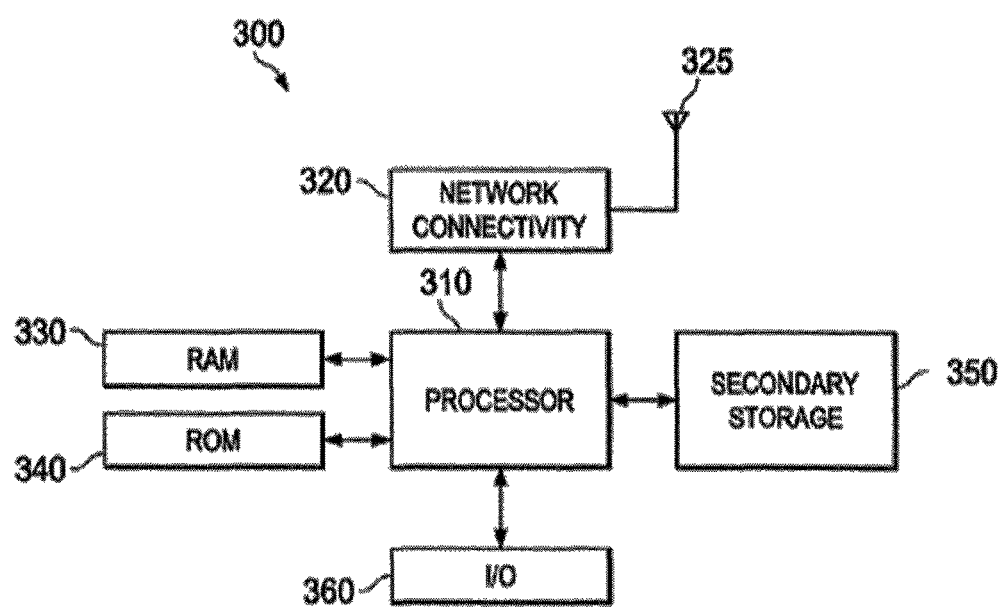
FIG. 3 is a simplified representation of a general-purpose processor (e.g. electronic controller or computer) system suitable for implementing the embodiments of the disclosure.

FIG. 3 illustrates a typical, general-purpose processor (e.g., electronic controller or computer) system 300 that includes a processing component 310 suitable for implementing one or more embodiments disclosed herein. In particular, the aircraft 10 may comprise one or more systems 300. In addition to the processor 310 (which may be referred to as a central processor unit or CPU), the system 300 might include network connectivity devices 320, random access memory (RAM) 330, read only memory (ROM) 340, secondary storage 350, and input/output (I/O) devices 360. In some cases, some of these components may not be present or may be combined in various combinations with one another or with other components not shown. These components might be located in a single physical entity or in more than one physical entity. Any actions described herein as being taken by the processor 310 might be taken by the processor 310 alone or by the processor 310 in conjunction with one or more components shown or not shown in the drawing. It will be appreciated that the data described herein can be stored in memory and/or in one or more databases.

The processor 310 executes instructions, codes, computer programs, or scripts that it might access from the network connectivity devices 320, RAM 330, ROM 340, or secondary storage 350 (which might include various disk-based systems such as hard disk, floppy disk, optical disk, or other drive). While only one processor 310 is shown, multiple processors may be present. Thus, while instructions may be discussed as being executed by a processor, the instructions may be executed simultaneously, serially, or otherwise by one or multiple processors. The processor 310 may be implemented as one or more CPU chips.

The network connectivity devices 320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 320 may enable the processor 310 to communicate with the Internet or one or more telecommunications networks or other networks from which the processor 310 might receive information or to which the processor 310 might output information.

The network connectivity devices 320 might also include one or more transceiver components 325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 325 might include separate receiving and transmitting units or a single transceiver. Information transmitted or received by the transceiver 325 may include data that has been processed by the processor 310 or instructions that are to be executed by processor 310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 330 might be used to store volatile data and perhaps to store instructions that are executed by the processor 310. The ROM 340 is a non-volatile memory device that typically has a smaller memory capacity than the memory capacity of the secondary storage 350. ROM 340 might be used to store instructions and perhaps data that are read during execution of the instructions. Access to both RAM 330 and ROM 340 is typically faster than to secondary storage 350. The secondary storage 350 is typically comprised of one or more disk drives or tape drives and might be used for non-volatile storage of data or as an over-flow data storage device if RAM 330 is not large enough to hold all working data. Secondary storage 350 may be used to store programs or instructions that are loaded into RAM 330 when such programs are selected for execution or information is needed.

The I/O devices 360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 325 might be considered to be a component of the I/O devices 360 instead of or in addition to being a component of the network connectivity devices 320. Some or all of the I/O devices 360 may be substantially similar to various components disclosed herein.

During operation of the aircraft 10, different amount of airflow in contact with proprotors 44, 62 leads to different torque being transmitted through the first mast torque transfer system relative to the second mast torque transfer system. The inputs can be caused by environmental conditions, such as, but not limited to, wind gusts attributable to weather, structures near the aircraft 10, and/or a position of the aircraft 10 relative to the ground and/or structures. The inputs can occur when the aircraft 10 is operating in an airplane mode, a helicopter mode, and/or when the aircraft 10 is transitioning between airplane mode and helicopter mode. In some cases when the inputs are uneven between the first and second mast torque transfer systems, the inputs can increase forces applied to the drive system 12. In some cases, drive system 12 components are flagged for inspection in response to the component being loaded in torque at 150 % of the desired operating torque. In some cases, one or more gearboxes are flagged for removal and/or rebuilding in response to the gearboxes being loaded in torque at 155 % of the desired operating torque. In some cases, the rotor components are flagged for removal and/or rebuilding in response to being exposed to 165 % of the desired operating torque.

Figure 4:
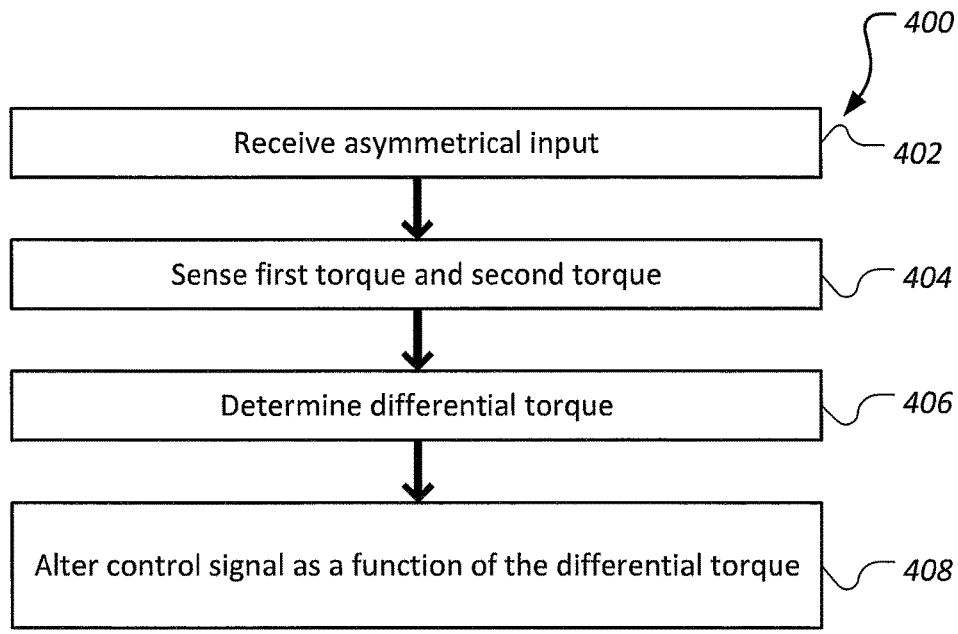
FIG. 4 is a flowchart of a method of limiting torque according to the present application.

Referring now to FIG. 4, a flowchart of a method 400 of limiting torque is shown. The method 400 may begin at block 402 by the first mast torque transfer system receiving a torque input that is different than an input (or lack thereof) received by the second mast torque transfer system. In some cases, the difference in inputs can be caused by an asymmetrical gust input where airflow encountered by the proprotors 44, 62 is unequal. Next, at block 404, the method 400 may sense a first torque and a second torque, such as the torque of the first mast torque transfer system and the torque of the second mast torque transfer system. In some cases, the sensors 106, 108 can be operated to conduct the sensing and report the sensed information to the system 300. Next, at block 406, the system 300 or another system can be utilized to determine a differential torque between the torque of the first mast torque transfer system and the torque of the second mast torque transfer system. Next, at block 408, the method can continue by altering a control signal as a function of the differential torque. In some cases, the altered control signal can cause a reduction in the difference of torque of the first mast torque transfer system and the torque of the second mast torque transfer system.

Figure 5:
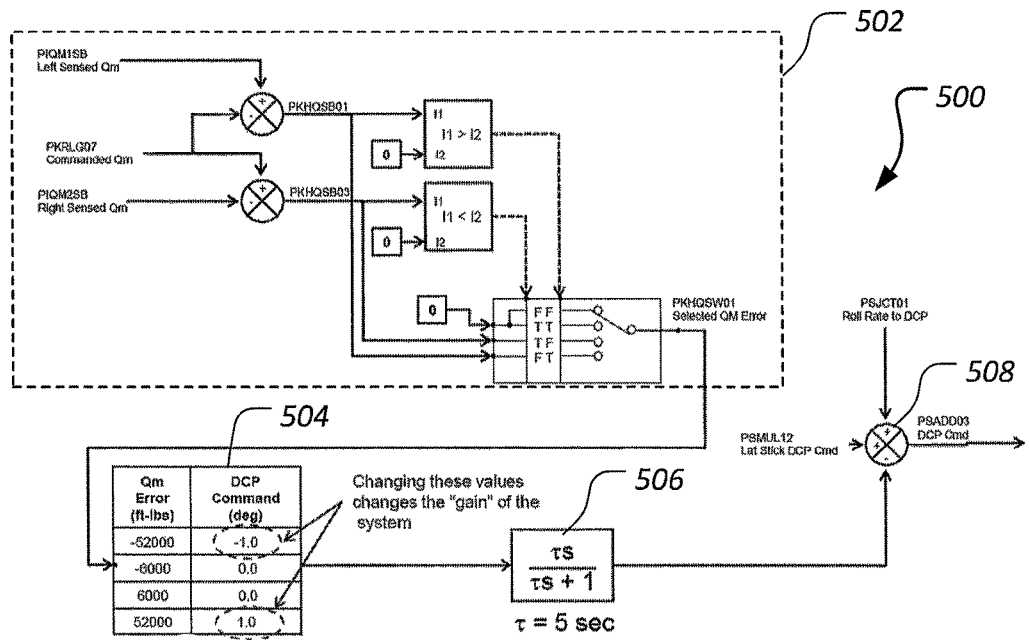
FIG. 5 is logic schematic of a system for limiting torque using differential collective pitch.

Referring now to FIG. 5, a logic schematic of a system 500 for limiting torque using differential collective pitch is shown. The system generally comprises a mast torque (Qm) Error (in some cases, a torque differential calculator) calculation function 502, a gain calculation function 504, a washout function 506, and a combination function 508. The torque differential calculation function 502 can receive information provided by torque sensors to determine an error (or alternatively, a difference) in the torque of the first and second torque transfer systems. The gain calculation function 504 can map the error values with desired changes in differential collective pitch as measured in degrees. The washout function 506 can, over time, reduce the impact static and/or steady state torque differentials can have on the output of the system 500. Finally, the combination function 508 can combine the output of the washed out gain calculation function 504 output with a lateral stick differential collective pitch command value and/or a roll rate to differential collective pitch value so that the output of the combination function takes into account the torque differential and causes reduction in the torque differential.

Figure 6:
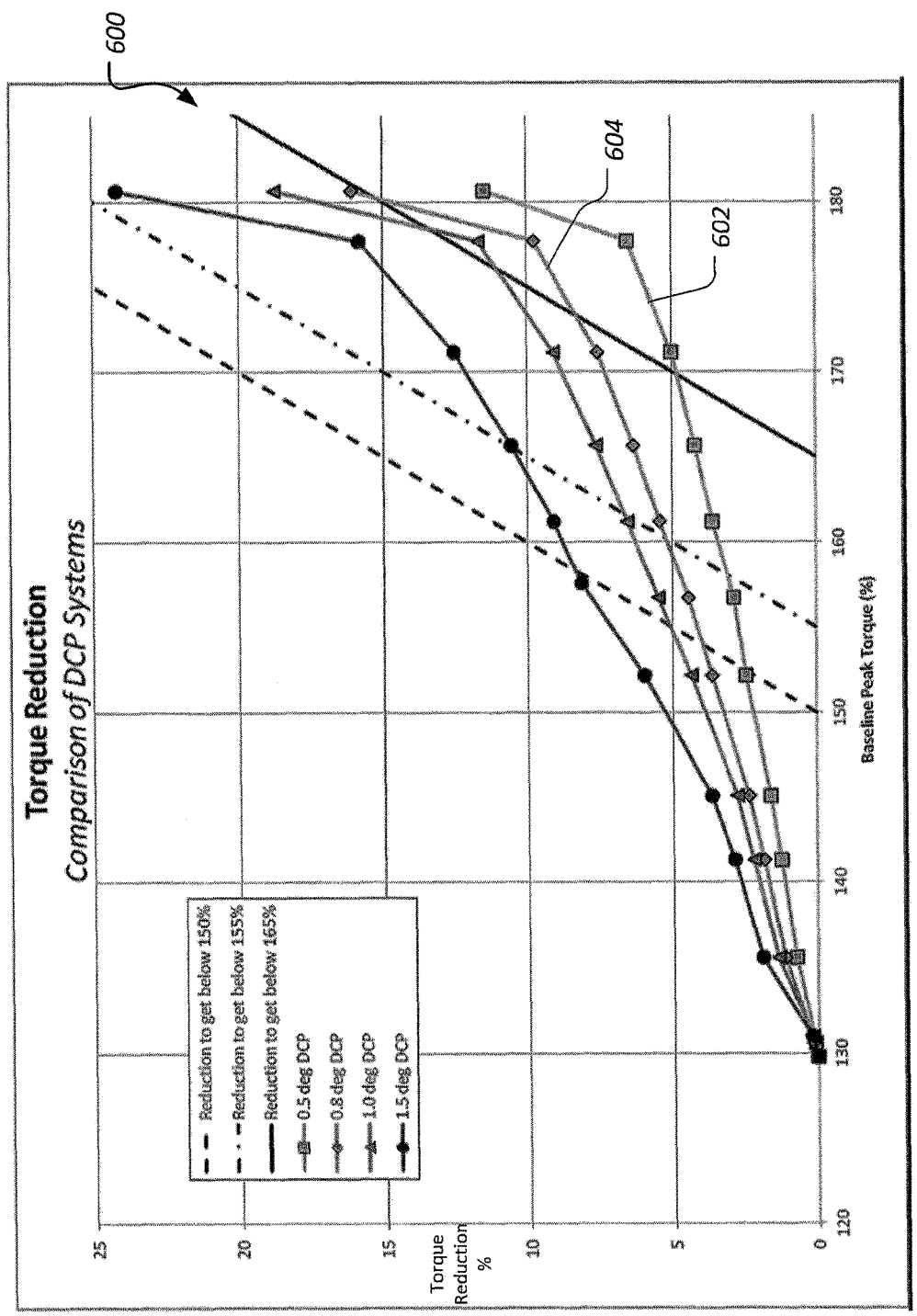
FIG. 6 is a chart demonstrating the performance of the system of FIG. 5 utilizing a linear differential collective pitch system.

Referring now to FIG. 6, simulated performances of the system 500 is shown in a chart 600. Line 602 shows performance of the system 500 when the gain is set to 0.5 degrees of differential collective pitch. Line 604 shows performance of the system 500 when the gain is set to 0.8 degrees of differential collective pitch. Line 606 shows performance of the system 500 when the gain is set to 1.0 degrees of differential collective pitch. Line 608 shows performance of the system 500 when the gain is set to 1.5 degrees of differential collective pitch.

Figure 7:
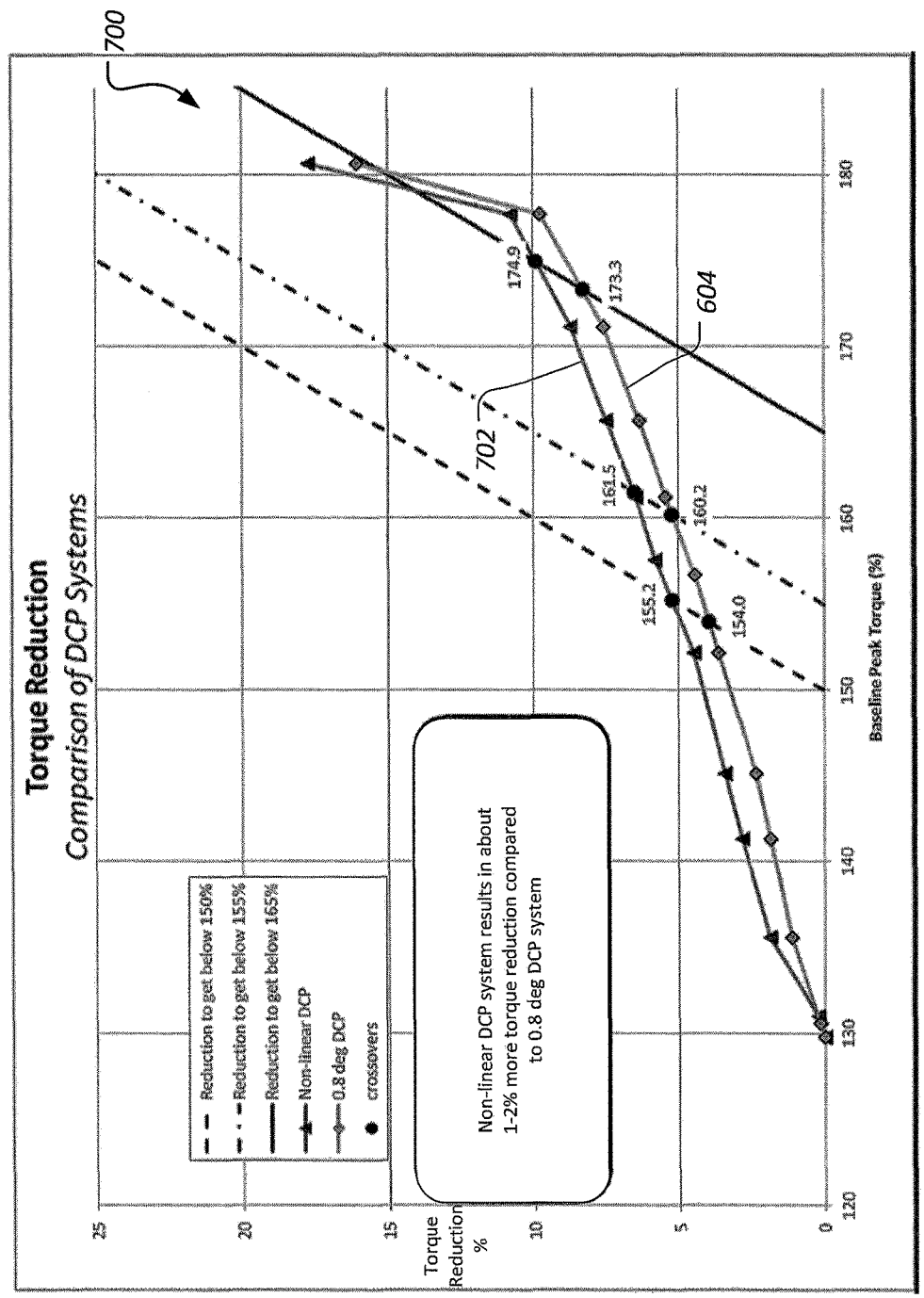
FIG. 7 is a chart demonstrating the performance of the system of FIG. 5 utilizing a non-linear differential collective pitch system.

Referring now to FIG. 7, simulated performances of a system substantially similar to system 500 is shown in a chart 700. Rather than comprising a linear gain regime, the system simulated in chart 700 comprised the following non-linear mapping of values: (−52,000 Qm Error, −0.8 degrees), (−20,000 Qm Error, −0.3 degrees), (−11,000 Qm Error, −0.16 degrees), (−6,000 Qm Error, 0 degrees), (6,000 Qm Error, 0 degrees), (11,000 Qm Error, 0.16 degrees), (20,000 Qm Error, 0.3 degrees), and (52,000 Qm Error, 0.8 degrees). Line 604 shows performance of the system 500 when the gain is set to 0.8 degrees of differential collective pitch. Line 702 shows performance of the non-linear system described above.

Figure 8:
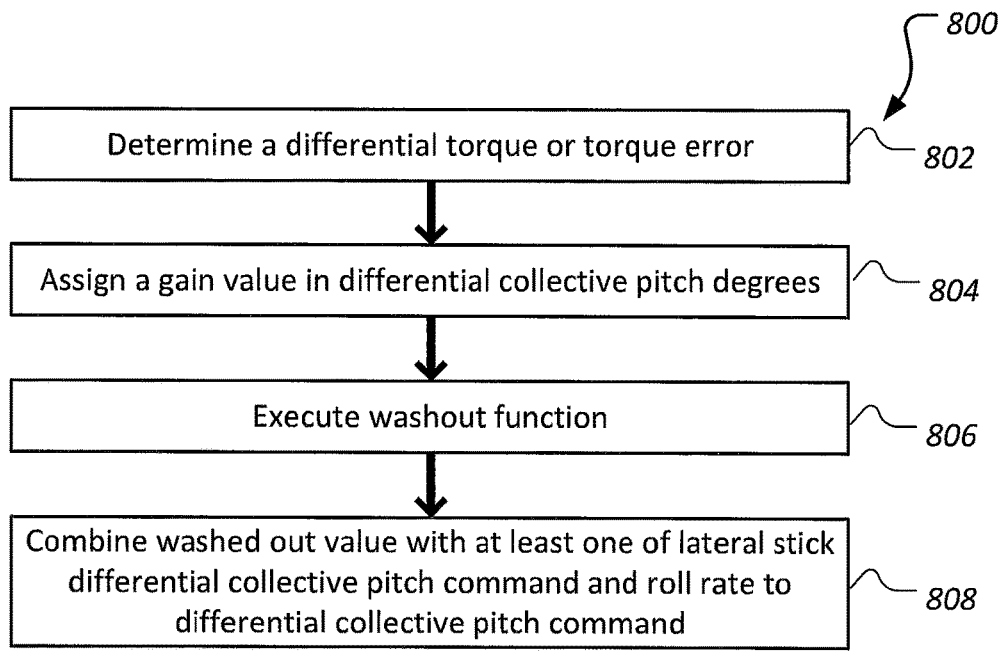
FIG. 8 is a flowchart of a method of operating the system of FIG. 5.

Referring now to FIG. 8, a flowchart of a method 800 of operating the system 500 is shown. The method 800 can begin at block 802 by determining a differential torque or torque error. The method 800 can continue at block 804 by mapping the differential torque value to a gain value, such as by assigning a value in differential collective pitch degrees. Next, the method 800 can reduced the impact of the differential torque over time at block 806 by executing the washout function, such as washout function 506. Next, the method 800 can combine the washed out value with at least one of a lateral stick differential collective pitch command or value and a roll rate to differential collective pitch command or value, with the result of the combination being utilized to execute a change in pitch of one or more of the rotorblades.

Figure 9:
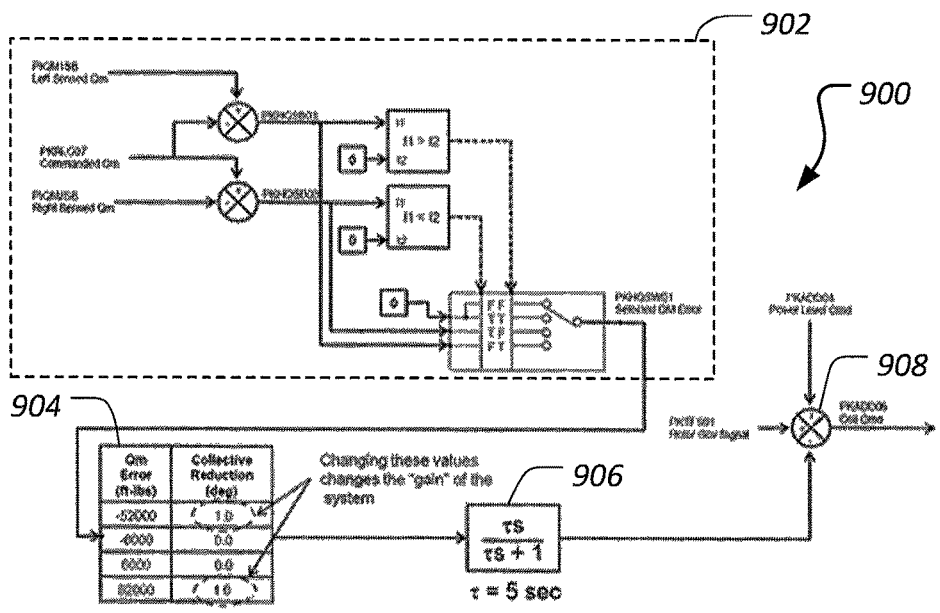
FIG. 9 is a logic schematic of a system for limiting torque using symmetrical pitch or collective.

Referring now to FIG. 9, a logic schematic of a system 900 for limiting torque using governor and/or collective control. The system generally comprises a mast torque (Qm) Error (in some cases, a torque differential calculator) calculation function 902, a gain calculation function 904, a washout function 906, and a combination function 908. The torque differential calculation function 902 can receive information provided by torque sensors to determine an error (or alternatively, a difference) in the torque of the first and second torque transfer systems. The gain calculation function 904 can map the error values with desired changes in symmetrical collective reduction as measured in degrees. The washout function 906 can, over time, reduce the impact static and/or steady state torque differentials can have on the output of the system 900. Finally, the combination function 908 can combine the output of the washed out gain calculation function 904 output with a power level command or value and/or a rotor governor signal or value so that the output of the combination function takes into account the torque differential and causes reduction in the torque differential.

Figure 10:
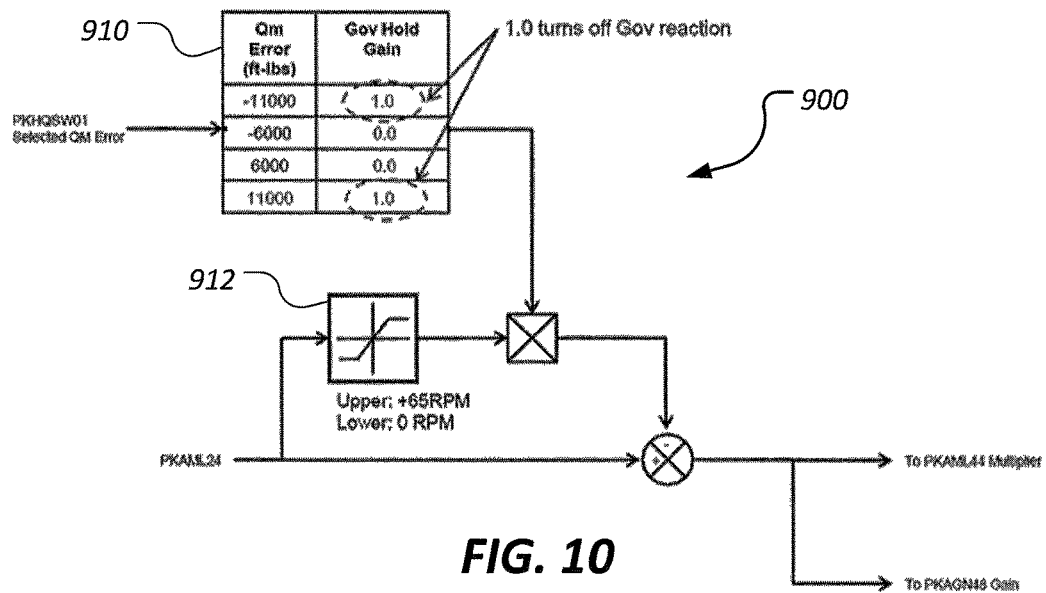
FIG. 10 is a logic schematic of a portion of the system of FIG. 9 showing disabling a governor reaction that would otherwise counter the actions of the logic shown in FIG. 9.

Referring to FIG. 10, a logic schematic of another portion of system 900 is shown. Gain function 910 maps the Qm Error to a governor hold value that is output for use by a limit function 912. The limit function generally prevents the governor from reacting to the change in rotations per minute so long as the change is 65 RPM or less. Accordingly, the normal operation of the governor will not fight against the system 900 for small RPM changes.

Figure 11:
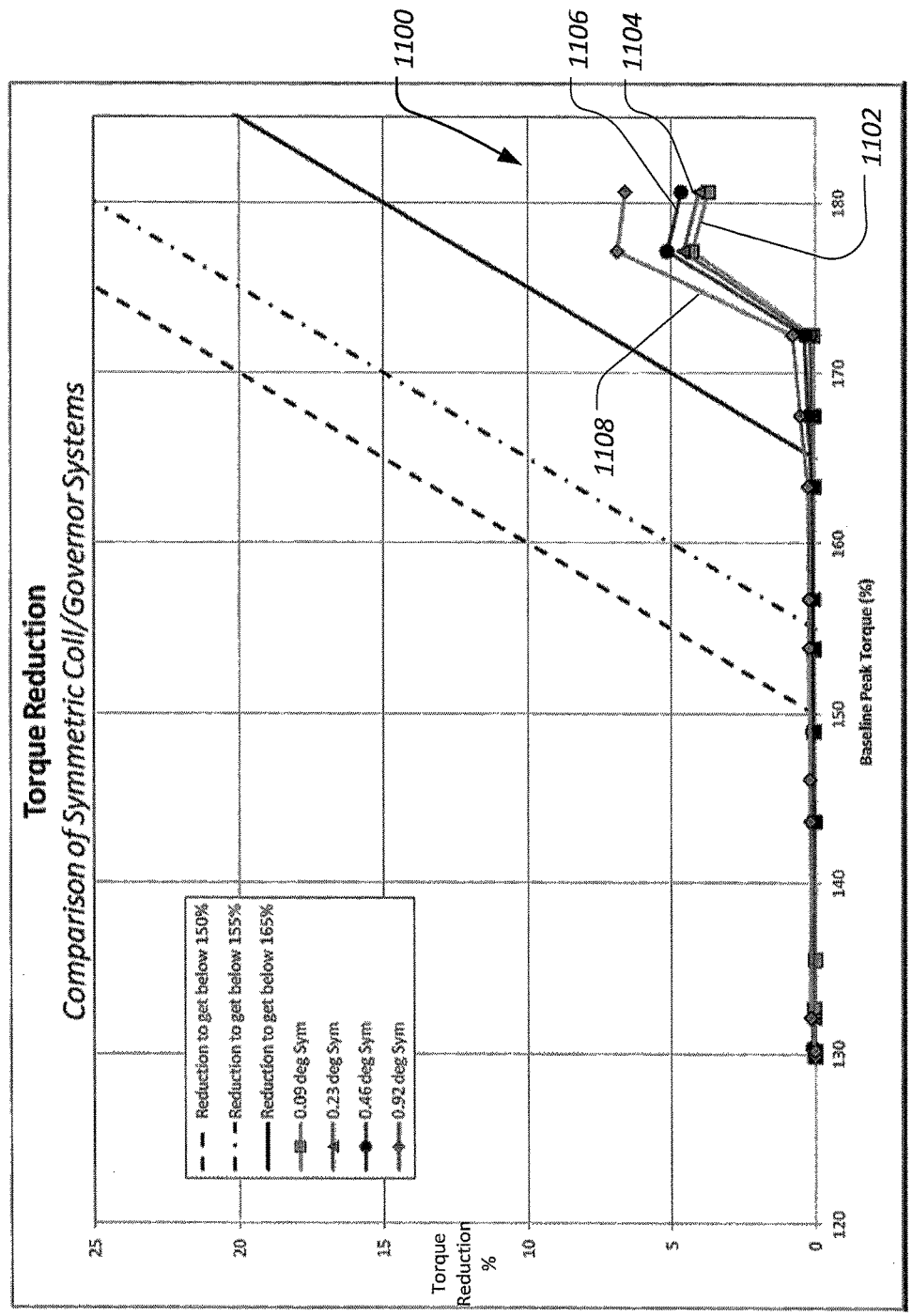
FIG. 11 is a chart demonstrating the performance of the system of FIG. 9.

Referring now to FIG. 11, simulated performances of the system 900 is shown in a chart 1100. Line 1102 shows performance of the system 900 when the gain is set to 0.9 degrees of symmetrical collective. Line 1104 shows performance of the system 900 when the gain is set to 0.23 degrees of symmetrical collective. Line 1106 shows performance of the system 900 when the gain is set to 0.46 degrees of symmetrical collective. Line 1108 shows performance of the system 900 when the gain is set to 0.92 degrees of symmetrical collective.

Figure 12:
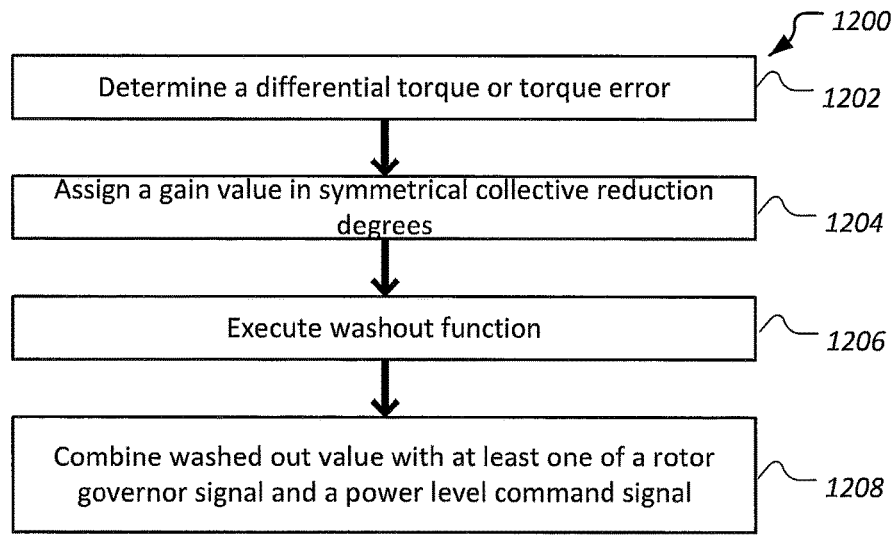
FIG. 12 is a flowchart of a method of operating the system of FIG. 9.

Referring now to FIG. 12, a flowchart of a method 1200 of operating the system 900 is shown. The method 1200 can begin at block 1202 by determining a differential torque or torque error. The method 1200 can continue at block 1204 by mapping the differential torque value to a gain value, such as by assigning a value in symmetrical collective reduction degrees. Next, the method 1200 can reduce the impact of the differential torque over time at block 1206 by executing the washout function, such as washout function 906. Next, the method 1200 can combine the washed out value with at least one of a rotor governor signal or value and a power level command signal or value, with the result of the combination being utilized to execute a change in symmetrical collective pitch.

Figure 13:
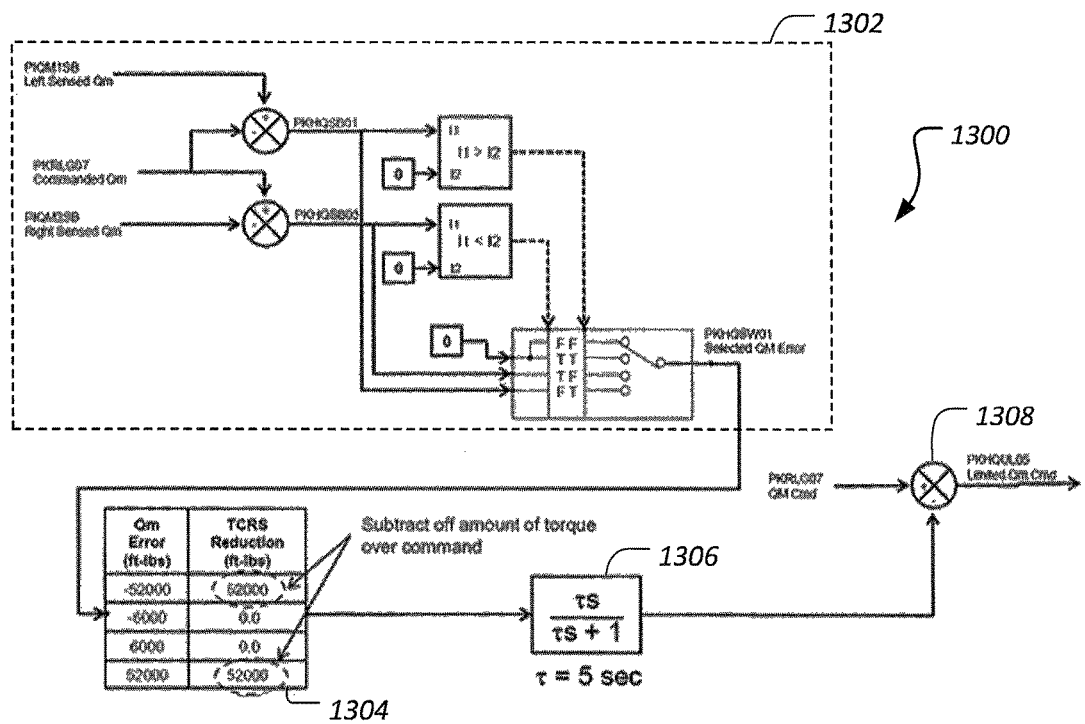
FIG. 13 is a logic schematic of a system for limiting torque using a power demand signal.

Referring now to FIG. 13, a logic schematic of a system 1300 for limiting torque using a torque command regulation system (TCRS). The system generally comprises a mast torque (Qm) Error (in some cases, a torque differential calculator) calculation function 1302, a gain calculation function 1304, a washout function 1306, and a combination function 1308. The torque differential calculation function 1302 can receive information provided by torque sensors to determine an error (or alternatively, a difference) in the torque of the first and second torque transfer systems. The gain calculation function 1304 can map the error values with desired changes in TCRS as measured in foot-pounds. The washout function 1306 can, over time, reduce the impact static and/or steady state torque differentials can have on the output of the system 1300. Finally, the combination function 1308 can combine the output of the washed out gain calculation function 1304 output with a Qm (mast torque) command or value so that the output of the combination function takes into account the torque differential and causes reduction in the torque differential.

Figure 14:
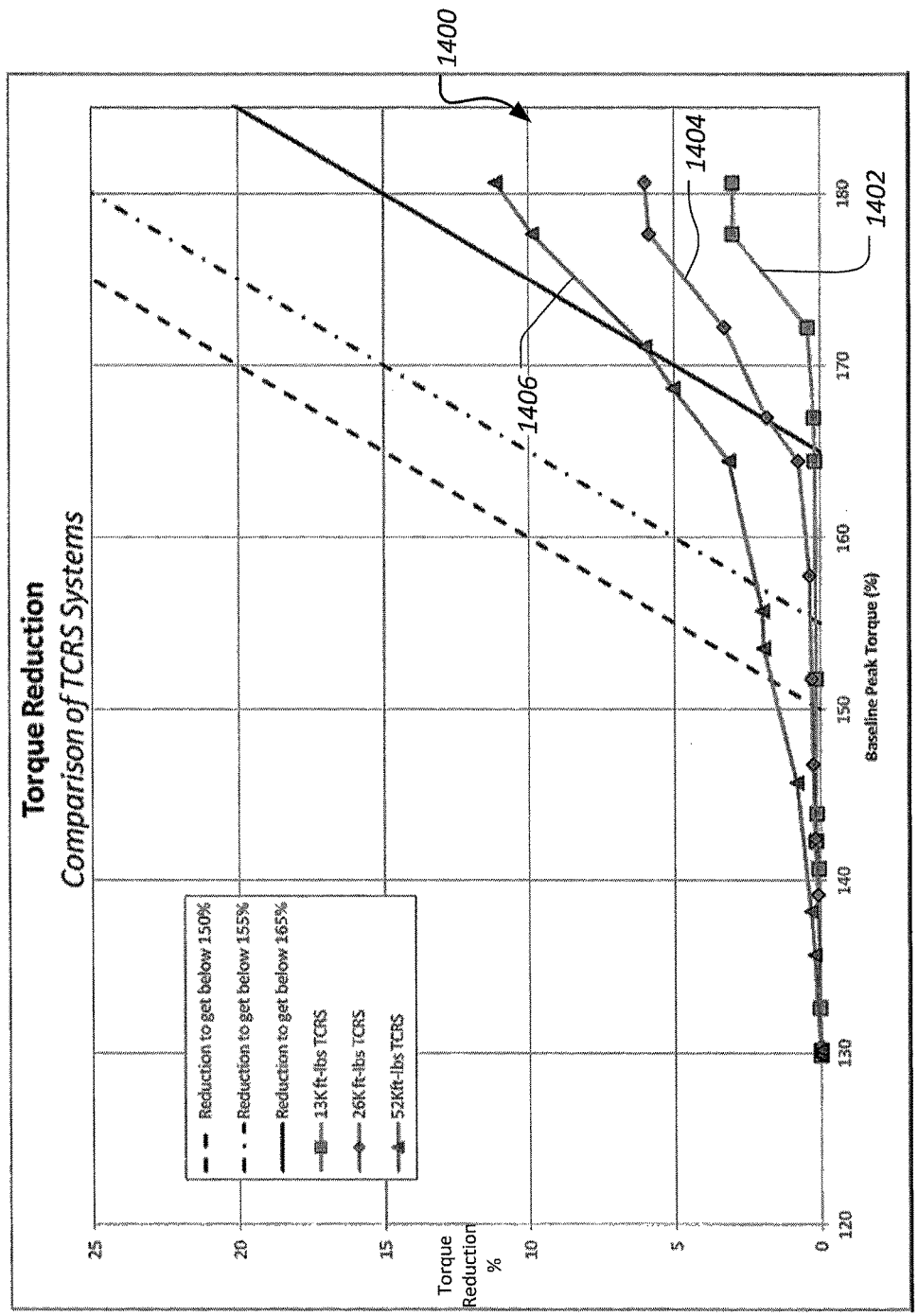
FIG. 14 is a chart demonstrating the performance of the system of FIG. 13.

Referring now to FIG. 14, simulated performances of the system 1300 is shown in a chart 1400. Line 1402 shows performance of the system 1300 when the gain is set to 13K ft-lbs of TCRS. Line 1404 shows performance of the system 1300 when the gain is set to 26K ft-lbs of TCRS. Line 1406 shows performance of the system 1300 when the gain is set to 52K ft-lbs of TCRS.

Figure 15:
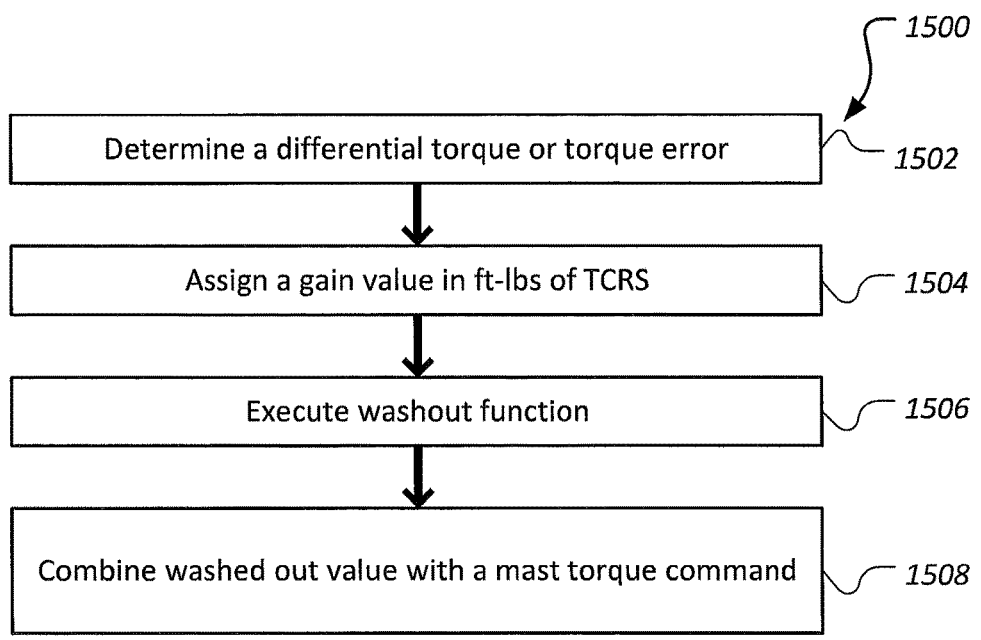
FIG. 15 is a flowchart of a method of operating the system of FIG. 13.

Referring now to FIG. 15, a flowchart of a method 1500 of operating the system 1300 is shown. The method 1500 can begin at block 1502 by determining a differential torque or torque error. The method 1500 can continue at block 1504 by mapping the differential torque value to a gain value, such as by assigning a value in ft-lbs of TCRS. Next, the method 1500 can reduce the impact of the differential torque over time at block 1506 by executing the washout function, such as washout function 1306. Next, the method 1500 can combine the washed out value with a mast torque command or value, with the result of the combination being utilized to execute a change in TCRS.

Figure 16:
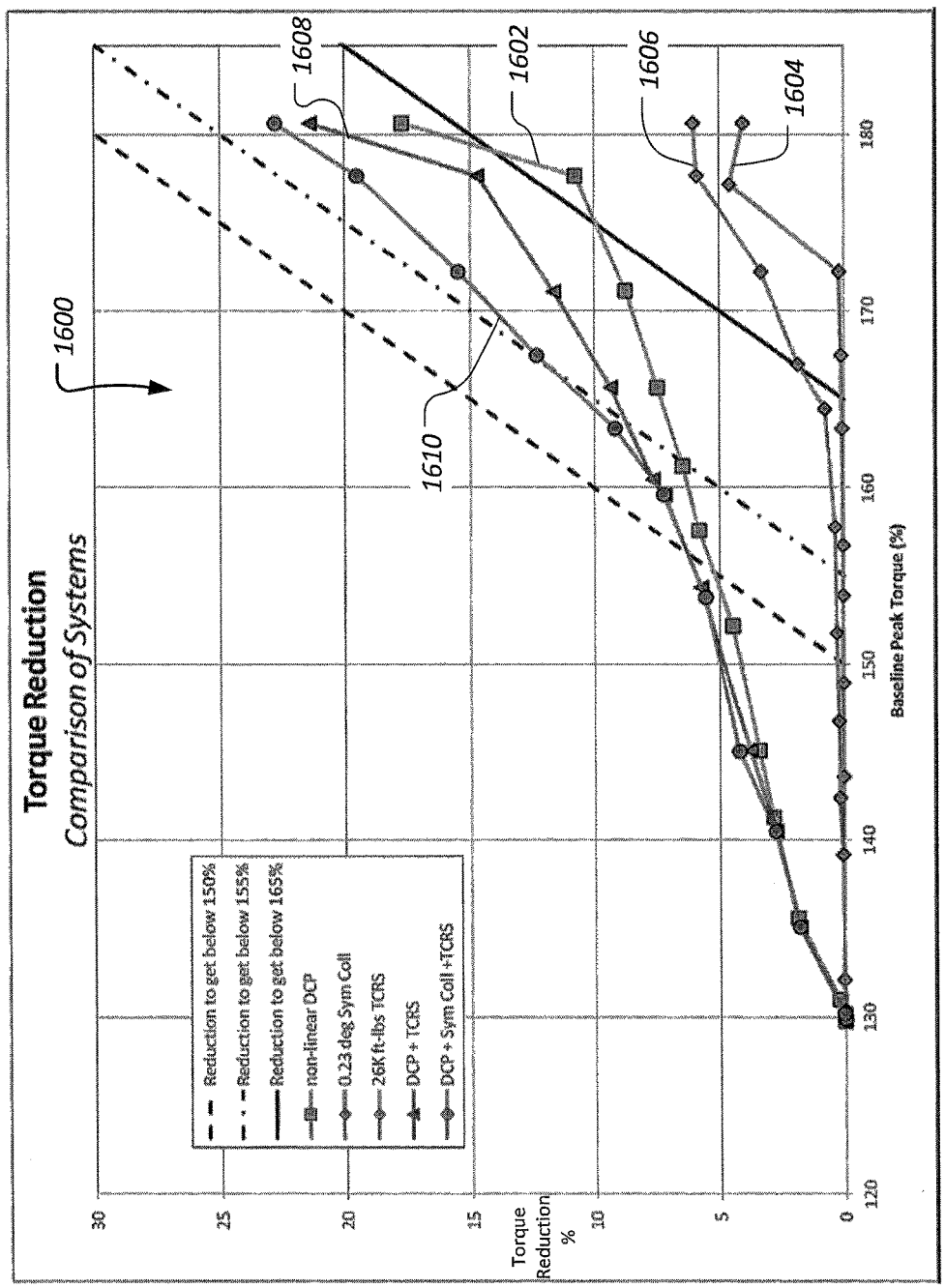
FIG. 16 is a chart comparing the performance of various combinations of the systems of FIGS. 5, 9, and 13.

Referring now to FIG. 16, a chart 1600 is provided that compares various combinations of systems 500, 900, and 1300. Line 1602 shows performance of the system non-linear version of system 500. Line 1604 shows performance of system 900. Line 1606 shows performance of system 1300. Line 1608 shows performance of a combination of systems 500 and 1300. Line 1610 shows performance of a combination of systems 500, 900, and 1300.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A system, comprising:
   a first mast torque transfer system;

a second mast torque transfer system coupled to the first mast torque transfer system; and
a torque limiting system, comprising:
  a first sensor configured to determine a torque of the first mast torque transfer system;
  a second sensor configured to determine a torque of the second mast torque transfer system; and
  a processor configured to determine a differential torque between the torque of the first mast torque transfer system and the torque of the second mast torque transfer system and configured to control at least one of a torque input and a torque output to at least one of the first and second mast torque transfer systems as a function of the determined differential torque.

2. The system of claim 1, wherein the processor is configured to determine a differential collective pitch command as a function of the determined differential torque.

3. The system of claim 2, wherein the processor is configured to combine the differential torque with a roll rate value and a lateral stick value.

4. The system of claim 1, wherein the processor is configured to determine a symmetric collective pitch command as a function of the determined differential torque.

5. The system of claim 4, wherein the processor is configured to combine the differential torque with a power level value and a rotor governor value.

6. The system of claim 1, wherein the processor is configured to determine a power demand signal engine command as a function of the determined differential torque.

7. The system of claim 6, wherein the processor is configured to combine the differential torque with a power demand value.

8. A method, comprising:
sensing a first sensor configured to determine a torque of the first mast torque transfer system;
sensing a second sensor configured to determine a torque of the second mast torque transfer system;
determining a differential torque between the first mast torque transfer system and the second mast torque transfer system coupled to the first mast torque transfer system; and
controlling at least one of a torque input and a torque output to at least one of the first and second mast torque transfer systems as a function of the determined differential torque.

9. The method of claim 8, further comprising:
determining a differential collective pitch command as a function of the determined differential torque.

10. The method of claim 9, further comprising:
combining the differential torque with a roll rate value and a lateral stick value.

11. The method of claim 8, further comprising:
determining a symmetric collective pitch command as a function of the determined differential torque.

12. The method of claim 11, further comprising:
combining the differential torque with a power level value and a rotor governor value.

13. The method of claim 8, further comprising:
determining a power demand signal engine command as a function of the determined differential torque.

14. The method of claim 13, further comprising:
combining the differential torque with a power demand value.

15. A tiltrotor aircraft, comprising:
a first mast torque transfer system;
a second mast torque transfer system coupled to the first mast torque transfer system; and
a torque limiting system, comprising:
  first sensor configured to determine a torque of the first mast torque transfer system;
  a second sensor configured to determine a torque of the second mast torque transfer system; and
  a processor configured to determine a differential torque between the torque of the first mast torque transfer system and the torque of the second mast torque transfer system and configured to control at least one of a torque input and a torque output to at least one of the first and second mast torque transfer systems as a function of the determined differential torque.

16. The tiltrotor aircraft of claim 15, wherein the differential torque is associated with a reaction to asymmetrical wind conditions acting on a first proprotor associated with the first mast torque transfer system and a second proprotor associated with the second mast torque transfer system.

17. The tiltrotor aircraft of claim 15, wherein the determined differential torque is associated with operation of the tiltrotor aircraft being operated in an airplane mode of flight.

18. The tiltrotor aircraft of claim 15, wherein the determined differential torque is associated with operation of the tiltrotor aircraft being operated in a helicopter mode of flight.

19. The tiltrotor aircraft of claim 15, wherein the processor is configured to determine at least one of a differential collective pitch command, a symmetric collective pitch command, and a power demand signal engine command as a function of the determined differential torque.

20. The tiltrotor aircraft of claim 15, wherein the processor is configured to combine the determined differential torque with at least one of a roll rate value, a lateral stick value, a power level value, a rotor governor value, and a power demand value.

* * * * *